(12) United States Patent
Schmid et al.

(10) Patent No.: US 12,280,639 B2
(45) Date of Patent: Apr. 22, 2025

(54) SHADING DEVICE

(71) Applicant: Bayerische Motoren Werke Aktiengesellschaft, Munich (DE)

(72) Inventors: Bernhard Schmid, Hallbergmoos (DE); Yongpeng Xia, Beijing (CN); Xiaofei Yang, Beijing (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 228 days.

(21) Appl. No.: 17/915,151

(22) PCT Filed: Apr. 1, 2021

(86) PCT No.: PCT/EP2021/058626
§ 371 (c)(1),
(2) Date: Sep. 28, 2022

(87) PCT Pub. No.: WO2021/198422
PCT Pub. Date: Oct. 7, 2021

(65) Prior Publication Data
US 2023/0116705 A1     Apr. 13, 2023

(30) Foreign Application Priority Data
Apr. 3, 2020 (CN) .......................... 202010259223.5

(51) Int. Cl.
*B60J 1/20* (2006.01)
(52) U.S. Cl.
CPC ........... *B60J 1/2027* (2013.01); *B60J 1/2041* (2013.01); *B60J 1/2044* (2013.01); *B60J 1/2052* (2013.01); *B60J 1/2066* (2013.01)
(58) Field of Classification Search
CPC ...... B60J 1/2027; B60J 1/2041; B60J 1/2044; B60J 1/2052; B60J 1/2066; B60J 1/2069; B60J 1/2083; E06B 2009/2405
See application file for complete search history.

(56) References Cited

U.S. PATENT DOCUMENTS

| 4,874,026 A | 10/1989 | Worrall | |
| 7,347,246 B2 * | 3/2008 | Ayran | B60J 1/2075 |
| | | | 160/370.22 |

(Continued)

FOREIGN PATENT DOCUMENTS

| CN | 1354100 A | 6/2002 |
| CN | 204210280 U | 3/2015 |

(Continued)

OTHER PUBLICATIONS

International Search Report (PCT/ISA/210) issued in PCT Application No. PCT/EP2021/058626 dated Jun. 21, 2021 (two (2) pages).

(Continued)

*Primary Examiner* — Abe Massad
(74) *Attorney, Agent, or Firm* — Crowell & Moring LLP

(57) ABSTRACT

A shading device includes a shading curtain and a drawing device. The shading curtain includes a first and second shading layer that have at least two types of light transmission areas with different light transmission properties. The drawing device includes a first and second drawing member. The first drawing member is connected with the first shading layer and is configured to draw the first shading layer. The second drawing member is connected with the second shading layer and is configured to draw the second shading layer. The first and second drawing members are movable relative to each other between a first relative position and a second relative position. The first and the second shading layers parallelly move relative to each other. In the first relative position, the shading curtain has a first light transmission property, and in the second relative position, the shading curtain has a second light transmission property.

19 Claims, 8 Drawing Sheets

(56) References Cited

U.S. PATENT DOCUMENTS

| | | | |
|---|---|---|---|
| 7,364,215 B2* | 4/2008 | Kim | B60J 1/2027 |
| | | | 296/97.4 |
| 7,934,764 B2* | 5/2011 | Hansen | B60J 1/2072 |
| | | | 160/370.22 |
| 8,382,200 B2* | 2/2013 | Mathes | B60J 3/06 |
| | | | 296/214 |
| 8,556,328 B1 | 10/2013 | Middleton | |
| 9,649,914 B2 | 5/2017 | Meier | |
| 10,926,612 B2* | 2/2021 | Kim | B60J 1/2033 |
| 2002/0060469 A1 | 5/2002 | Schlecht et al. | |
| 2012/0193044 A1* | 8/2012 | Ojima | B60J 1/2083 |
| | | | 160/370.22 |
| 2019/0047381 A1 | 2/2019 | Lekar et al. | |
| 2024/0174058 A1* | 5/2024 | Yang | B60J 1/2041 |

FOREIGN PATENT DOCUMENTS

| | | | | |
|---|---|---|---|---|
| DE | 10 2016 202 016 A1 | 8/2017 | | |
| FR | 2941735 B1 * | 12/2016 | | B60J 7/0015 |
| TW | M591928 U | 3/2020 | | |
| WO | WO 2013/171038 A1 | 11/2013 | | |

OTHER PUBLICATIONS

Written Opinion (PCT/ISA/237) issued in PCT Application No. PCT/EP2021/058626 dated Jun. 21, 2021 (five (5) pages).

English translation of Taiwanese-Language Search Report issued in Taiwanese Application No. 110110905 dated Sep. 26, 2024 (1 pages).

European Office Action issued in European Application No. 21 717 778.1 dated Apr. 3, 2024 (5 pages).

English translation of Taiwanese-language Office Action issued in Taiwanese Application No. 110110905 dated Sep. 27, 2024 (11 pages).

English translation of Chinese-language Office Action issued in Chinese Application No. 202010259223.5 dated Feb. 8, 2025 (9 pages).

* cited by examiner

SHADING DEVICE

BACKGROUND AND SUMMARY OF THE INVENTION

The present invention relates to a shading device for shading the light. The shading device may be applied to such as a vehicle, for example may be applied to a side window, a windshield, a back window or a sunroof of a passenger car.

In some known vehicles a shading device is provided and it may be used for shading the light such as the sunlight on a sunny summer day, which may be energy-efficient and may improve the comfort of a passenger. The shading device may have a shading curtain. A conventional shading curtain for a vehicle has a single layer with a substantially constant transmission property.

An object of the present invention is to provide a shading device, by which a variable shading effect can be reliably realized.

For this purpose, a shading device is proposed, comprising:
- a shading curtain having a first and a second shading layer that respectively have at least two types of light transmission areas with different light transmission properties; and
- a drawing device having a first and a second drawing member, wherein the first drawing member is connected with the first shading layer and is configured to draw the first shading layer, and second drawing member is connected with the second shading layer and is configured to draw the second shading layer;
- wherein the first and the second drawing member can move relative to each other between a first relative position and a second relative position, wherein the first and the second shading layer parallelly move relative to each other, wherein the shading curtain has a first light transmission property in the first relative position and has a second light transmission property in the second relative position.

In the shading device according to embodiments of the present invention, the light transmission property of the shading curtain may be adjusted as required. For example, the shading curtain may be switched to its maximum light transmission state, in order to obtain the external light within the vehicle or observe the outside from the inside of the vehicle. For example, the shading curtain may also be switched to its minimum light transmission state, such as an opaque state, in order to shield the hot sunlight or obtain better privacy.

In some embodiments, the shading curtain may be switched between an inactive retracted state and an active deployed state. In other embodiments, the shading curtain may be permanently kept in the active deployed state.

In some embodiments, the drawing device may be configured to draw the shading curtain from the inactive retracted state to the active deployed state.

In some embodiments, a deployment direction of the shading curtain may be identical to a movement direction of the first and the second drawing member relative to each other. This is particularly friendly in a deployment operation of the shading curtain and in a switching operation of the light transmission states of the shading curtain.

In some embodiments, the shading device may comprise a driving device configured to drive the drawing device. For example, the driving device may be an electric motor or a hydraulic driving device.

In some embodiments, the driving device may be configured to drive the drawing device, so that the drawing device moves as a whole to deploy and/or retract the shading curtain. Alternatively or additionally thereto, the driving device may be configured to drive the drawing device, so that the first and the second drawing member linearly move relative to each other.

In some embodiments, the driving device may be configured such that the first and the second drawing member can be switched to an arbitrary relative position between the first relative position and the second relative position. In some other embodiments, the driving device may be configured such that the first and the second drawing member can be switched to either the first relative position or the second relative position.

In some embodiments, the driving device may be configured to drive one of the drawing members of the drawing device.

In some embodiments, the driving device may be configured to drive the same one drawing member of the drawing device, such as the first or the second drawing member, during a deployment movement of the shading curtain and during a movement of the first and the second drawing member relative to each other following the deployment movement.

In some embodiments, the driving device can drive the drawing device, for example the first drawing member of the drawing device, by way of a support rod.

In some embodiments, the support rod can move in a plane.

In some embodiments, the shading device may comprise a guide rail configured to receive and guide the support rod.

In some embodiments, the driving device can drive the support rod by way of a Bowden cable.

In some embodiments, the guide rail may be further configured to receive and guide a longitudinal side of the shading curtain.

In some embodiments, the first and the second drawing member can be held in one of the first and the second relative position under the action of a holding force, and can be switched to the other of the first and the second relative position against the holding force.

For example, the holding force may be realized by a releasable snap connection, a magnetic force of mutually attractive magnets or mutually repulsive magnets, a static friction force or an elastic deformation force.

In some embodiments, the first and the second drawing member can be held in the one relative position by a holding force of an elastic element.

In some embodiments, the elastic element may be a spring element that biases one of the drawing members in the first relative position relative to the other drawing member, and the one drawing member can translationally move to the second relative position relative to the other drawing member against the spring force of the spring element by a predetermined displacement.

In some embodiments, the spring element may be a tension spring, a pressure spring and/or a torsion spring.

In some embodiments, the first and the second relative position of the first and the second drawing member may be respectively defined by a pair of stops of the drawing device.

In some embodiments, the first and the second drawing member may have the stops for the second relative position at their ends.

In some embodiments, the spring element may bias, with an end thereof, a first stop of the one drawing member for the first relative position against a first counter stop that is stationary relative to the other drawing member, and may be, with the other end thereof, fixed to the other drawing member.

In some embodiments, the drawing device may comprise a spring seat arranged between the first and the second drawing member, wherein the spring element is received in the spring seat.

In some embodiments, the spring seat may have the first counter stop.

In some embodiments, the drawing device may have a linear guide that defines a relative movement direction of the first and the second drawing member.

In some embodiments, the linear guide may include a guide groove in one of the first and second drawing member and a protrusion on the other of the first and second drawing member, wherein the protrusion can be guided in the guide groove.

In some embodiments, as viewed in a height direction of the drawing device that is vertical to the relative movement direction of the first and the second drawing member, the linear guide may include a pair of guide grooves and a pair of protrusions.

In some embodiments, as viewed in the height direction of the drawing device, the spring element may be centrally arranged between the pair of guide grooves and between the pair of protrusions.

In some embodiments, the protrusion may be hook-like.

In some embodiments, the hook-like protrusion may be held in engagement with the guide groove by a holding plate that may be arranged between the first and the second drawing member and may be connected with the one drawing member.

In some embodiments, one of the first and the second drawing member, in the entire circumference or alternatively in the circumference exclusive of a back side, may have a curved edge that surrounds the other of the first and the second drawing member.

In some embodiments, the first and the second light transmission properties may correspond to the same or different light transmission amounts of the shading curtain.

In some embodiments, the first light transmission property may correspond to one of the maximum and the minimum light transmission amounts of the shading curtain, preferably the maximum light transmission amount, and the second light transmission property may correspond to the other of the maximum and the minimum light transmission amounts of the shading curtain, preferably the minimum light transmission amount, especially an opaque state.

In some embodiments, each individual shading layer may have distributed first and/or second light transmission areas, for example, the first and second light transmission areas may be arranged alternately and periodically, and preferably an extension direction of the first and second light transmission areas is orthogonal to a deployment direction of the shading curtain.

In some embodiments, an area size of the individual first light transmission areas may be less than or equal to an area size of the individual second light transmission areas, and/or a light transmission rate of the first light transmission areas may be greater than that of the second light transmission areas.

In some embodiments, it is possible that in the first relative position, the first light transmission areas of the first and the second shading layer overlap, and the second light transmission areas of the first and the second shading layer overlap; and/or in the second relative position, the first light transmission areas of the first shading layer overlap with the second light transmission areas of the second shading layer, and the second light transmission areas of the first shading layer overlap with the first light transmission areas of the second shading layer.

In some embodiments, the first and the second shading layer may be respectively made of a flexible material.

In some embodiments, the first and the second shading layer may contact each other areally.

In some embodiments, the shading device may be configured for a vehicle, such as a motor vehicle, especially a passenger car. The shading device may be configured for a side window, a windshield, a back window or a sunroof of a motor vehicle.

In some embodiments, the shading curtain may be configured to be deployed from one of a front side and a rear side of the side window to the other side.

In some embodiments, the shading curtain may be rolled up.

In some embodiments, the shading device may comprise a return spring acting on the shading curtain in a winding direction.

In some embodiments, the first and the second shading layer may be respectively provided with a reel and a return spring acting on the reel in the winding direction.

In some embodiments, the shading device may have a housing, into which the shading curtain may be rolled and in which the reel and the return spring for the shading curtain may be accommodated.

In some embodiments, the housing may have a first guide edge for the first shading layer and a second guide edge for the second shading layer.

In some embodiments, the shading device may have a first guide rail having a groove configured to receive and guide a first longitudinal side of the shading curtain. When the shading curtain is in a partially or finally deployed state, a deployed section of the first longitudinal side of the shading curtain is received at least partially in the groove.

In some embodiments, the first longitudinal side may have a support member, by which the first longitudinal side can be received and guided in the groove.

In the shading device, in a way that the first longitudinal side of the shading curtain is received and guided in the groove of the first guide rail, a relatively stable shading effect may be obtained, or the disturbing noise caused by collision of components of the shading device may be at least reduced, or the possible light leakage in the first longitudinal side may be at least reduced.

In some embodiments, the groove may be U-shaped.

In some embodiments, the first shading layer may have a first support member.

In some embodiments, the second shading layer may have a second support member.

In some embodiments, a winding axis of the shading curtain may be substantially in a vertical line. Therefore, the shading curtain can be pulled laterally, or to say can be deployed and rolled up in a direction substantially vertical to a vertical line.

In some embodiments, the winding axis of the shading curtain may form an angle of no more than 30 degrees, for example about 5 degrees, about 10 degrees or about 15 degrees, with a vertical line.

In some embodiments, the first longitudinal side may be an upper longitudinal side and the second longitudinal side may be a lower longitudinal side.

In comparison, in a well known shading device, a winding axis of a shading curtain is in a horizontal line, and thus this shading curtain can be pulled up and down.

In some embodiments, the support member is configured for sliding along the groove.

In some embodiments, a width of the groove and a width of the first longitudinal side of the shading curtain together with the support member may be adapted to each other, so that the first longitudinal side of the shading curtain together with the support member may form a clearance fit with the groove.

In the research, the inventors of the present invention found, in comparison with a shading curtain that can be pulled up and down, an upper longitudinal side of a shading curtain that can be pulled laterally may be easily affected by external interference such as vehicle vibration and so on. In addition, the inventors found, reinforcement measures for the upper longitudinal side of the shading curtain may be unfavorable to the shape stability of the shading curtain during a deployment process and in a finally deployed position due to the increase of gravity. It is surprising that the shape stability of the shading curtain during the deployment process and in the finally deployed position can be improved by way of the appropriate reception and guidance of the support member in the first guide rail. With the aforementioned clearance fit, the shape stability of the shading curtain can be further enhanced. For example, the shading curtain may be kept in good flatness and stable shading performance during the deployment process and in the finally deployed position.

In some embodiments, the support member may be arranged on a side surface of a first longitudinal side of the respective shading layer.

In some embodiments, the support member may form an edge of a first longitudinal side of the respective shading layer.

In some embodiments, the support member and the first guide rail may generate a magnetic attractive force and/or a magnetic repulsive force.

In the case where the shading curtain can be pulled laterally, especially in a combination of the magnetic force with the aforementioned clearance fit, it may be further ensured that the shading curtain is always kept in good flatness and stable shading performance during the deployment process and in the finally deployed position.

In some embodiments, the support member may be configured to generate a magnetic attractive force and/or a repulsive force with at least one side wall and/or a bottom of the first guide rail.

In some embodiments, the support member has a magnet or is at least partially made of a magnetic material, and the first guide rail has a magnet or is at least partially made of a magnetic material.

In some embodiments, the first support member may be configured to generate a magnetic attractive force with a first groove wall of the first guide rail.

In some embodiments, the second support member may be configured to generate a magnetic attractive force with a second groove wall of the first guide rail opposite to the first groove wall.

In some embodiments, a first support member may be configured to generate a magnetic attractive force with the bottom of the first guide rail.

In some embodiments, a second support member may be configured to generate a magnetic attractive force with the bottom of the first guide rail.

In some embodiments, the first and the second support member may be configured to maintain a spacing between deployed sections of the first and the second shading layer during a movement of the shading curtain and/or in a stationary state of the shading curtain.

In some embodiments, the shading device may comprise a second guide rail having a groove.

In some embodiments, the groove of the second rail may be configured to receive and guide a second longitudinal side of the shading curtain.

In some embodiments, the second longitudinal side may have a support member, by which the second longitudinal side can be received and guided in the groove of the second guide rail.

In some embodiments, the support member of the second longitudinal side and the second guide rail can generate a magnetic attractive force and/or a magnetic repulsive force.

In some embodiments, the support member of the second longitudinal side may be configured to maintain a spacing between deployed sections of the first and the second shading layer during a movement of the shading curtain and/or in a stationary state of the shading curtain, especially in cooperation with the support member of the first longitudinal side.

In some embodiments, the support member may be a member extending continuously on the first longitudinal side of the shading curtain, or may be a plurality of members distributed on the first longitudinal side of the shading curtain.

In some embodiments, the support member may be an integral part of the respective longitudinal side, or may be attached to the respective longitudinal side as a separate attachment.

In some embodiments, one of the first and the second shading layer of the shading curtain may have a support member on the first longitudinal side, while the other shading layer may have no support member on the first longitudinal side. At least one of the first and the second shading layer can be received and guided in the groove of the second guide rail by way of the support member.

In some embodiments, the second guide rail and the second longitudinal side may have the same or similar magnet arrangement as the first guide rail and the first longitudinal side.

It should be pointed out, individual technical features mentioned above, individual technical features to be mentioned below and individual technical features that can be obtained in the drawings can be arbitrarily combined with each other, as long as the technical features to be combined are not contradictory.

Embodiments of the present invention will now be described with reference to the accompanying drawings.

DETAILED DESCRIPTION OF THE DRAWINGS

In order to make the object, features and advantages of the present invention more understandable, specific embodiments of the present invention will be described in detail with reference to the accompanying drawings. In the following description, specific details are set forth in order to provide thorough understanding of the present invention. However, the present invention may be implemented in other ways different from those described here, and those skilled in the art may make modifications without leaving away the sense of the present invention. Therefore, the present invention is not limited to the specific embodiments disclosed below.

It should be pointed out, the singular form in the texts also includes the plural form, unless excluded explicitly. Furthermore, as used herein, components, steps, operations and elements referring to "comprising" or "including" mean that at least one other component, step, operation and element may be present or added. The terms "first" and "second" in the texts are used for the convenience of describing and distinguishing different components having the same name, and do not indicate the order or a primary and secondary relationship of these components.

Figure 1A:
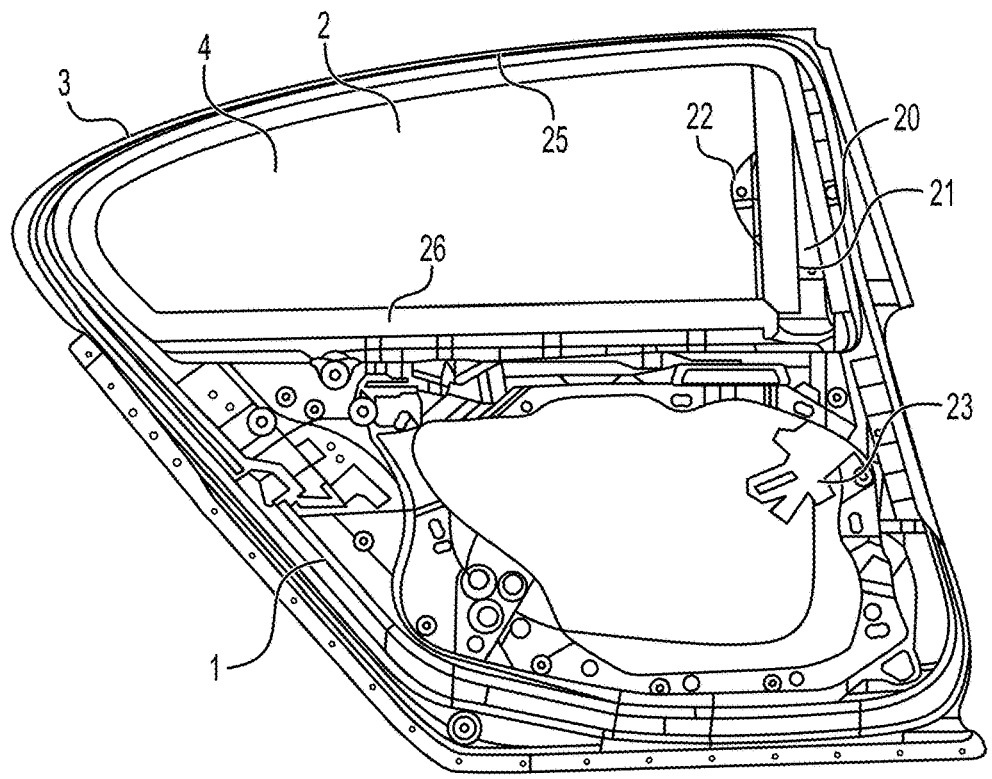
FIGS. 1A to 1C are perspective views of a vehicle door equipped with a shading device according to an embodiment of the present invention.
Figure 1B:
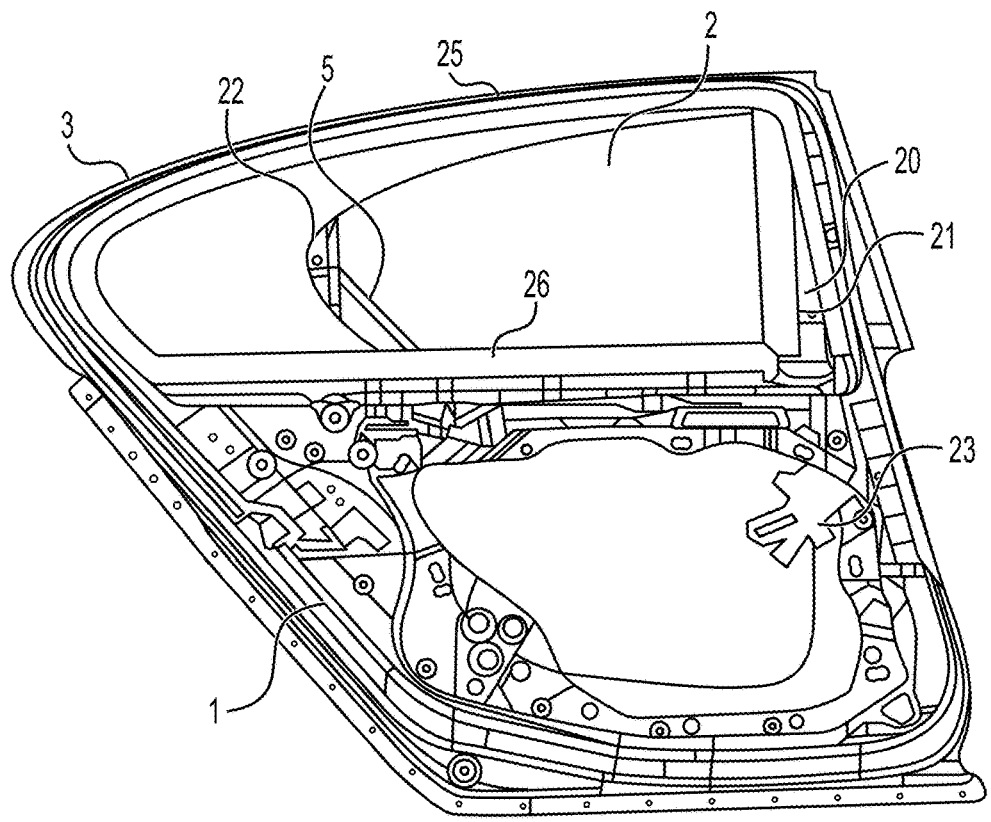
Figure 1C:
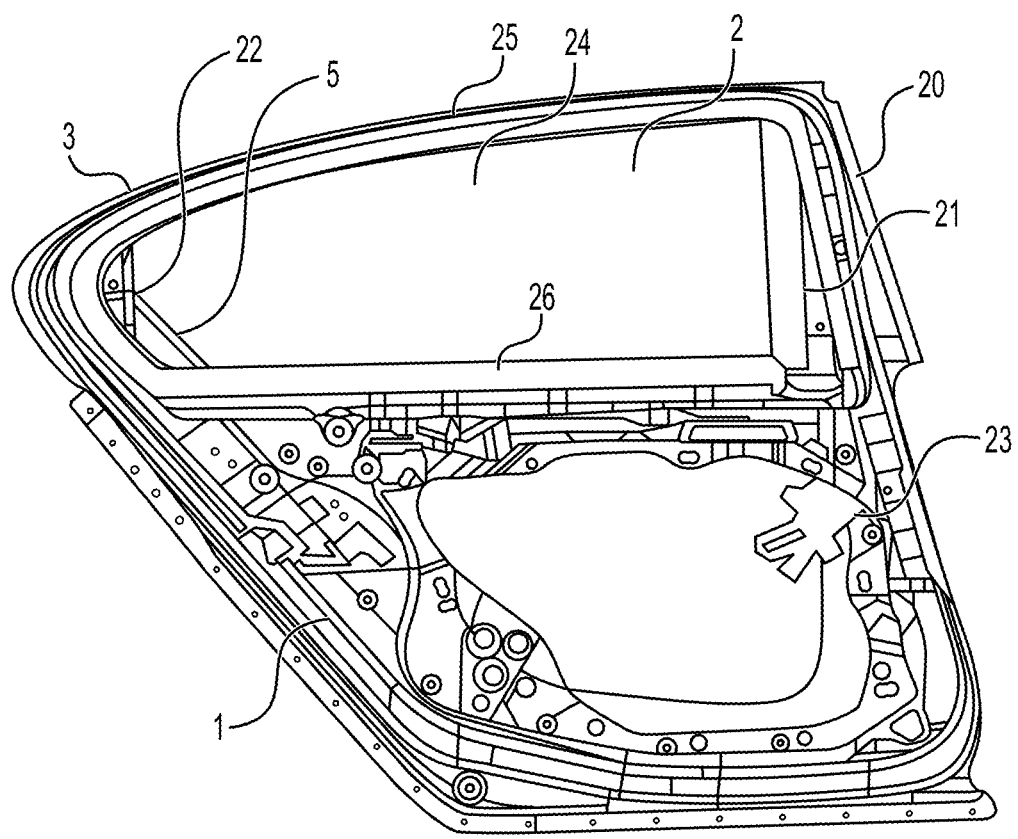

FIGS. 1A to 1C are perspective views of a vehicle door 1 equipped with a shading device 20 according to an embodiment of the present invention as viewed from the inside of a vehicle, wherein an inactive retracted state (e.g. a predetermined final rolled-up state) of the shading device 20 is shown in FIG. 1A, an intermediate state of the shading device 20 during a deployment process is shown in FIG. 1B, and an active deployed state (a predetermined final deployed state) of the shading device 20 is shown in FIG. 1C, in which the shading device 20 may at least partially shield the light from the outside of the vehicle window into an inner room of the vehicle.

The vehicle door 1 has a side window 2 having a window frame 3 and a window glass 4 mounted in the window frame. The side window 2 is provided with the shading device 20 that may be arranged in the inner room of the vehicle, in other words, in the inside of the side window 2. The shading device 20 includes a shading curtain 24. The shading device 20 may include a housing 21 that may be mounted for example in a rear end region of the side window 2, wherein the shading curtain 24 may be rolled up and accommodated in the housing 21, and may be pulled out from the housing 21 by a drawing device 22 until reaching a front end region of the side window 2 opposite to the rear end region, i.e. reaching an active deployed state.

The shading device 20 may further include a driving device 23 that may be arranged for example on a sheet metal part of the vehicle door, and may be covered by a door trim panel. The driving device 23 may be for example an electric motor. The driving device 23 may be configured to drive the drawing device 22 so as to move the drawing device 22 as a whole to deploy and/or retract the shading curtain 24. The transmission between the driving device 23 and the drawing device 22 may be suitably designed as required. For example, the driving device 23 may drive a Bowden cable that can drive an operation rod 5, which can operate the drawing device 22. For example, it is also possible that the driving device 23 drives an endless wire rope transmission that can drive an operation element such as the operation rod 5, which can operate the drawing device 22.

The shading device may have a guide rail 26 in which the operation element such as the operation rod 5 and/or the Bowden cable may be guided. To this end, for example, the guide rail 26 may have a groove. The driving device 23 drives the operation element such as the operation rod 5 to move in the groove of the guide rail. It is advantageous that the operation rod 5 can move in a plane. It is particularly advantageous that the operation rod 5 can be deflected by a predetermined angle from the inactive retracted position, i.e. from a substantially vertical position, in a predetermined deployment displacement of the shading curtain 24, and then the angular position of the operation rod 5 can be kept unchanged in the following deployment displacement of the shading curtain 24. Additionally, a longitudinal side of the shading curtain 24 (a lower longitudinal side of the shading curtain in FIGS. 1A to 1C) may also be received and guided in the groove of the guide rail 26.

The shading device may have a guide rail 25 configured for the other longitudinal side of the shading curtain 24 (an upper longitudinal side of the shading curtain in FIGS. 1A to 1C). The upper guide rail arrangement of the shading device will be described in more detail with reference to FIGS. 3A and 3B.

The usage of the shading device 20 shown in FIGS. 1A to 1C is exemplary. In an alternative usage, a deployed length of the shading curtain 24 may correspond to a part of the length of the side window 2, for example a half length thereof. In an alternative usage, the housing of the shading device may be arranged in a lower end region of the side window 2, and the shading curtain may be deployed in an upward direction toward an upper end region of the side window 2. In an alternative usage, the shading device 20 may be permanently kept in the final deployed state.

The shading curtain 24 may include a first and a second shading layer 241, 242 that may respectively have at least two types of light transmission areas with different light transmission properties. The shading curtain 24 will be described in more detail with reference to FIGS. 4A to 4C and FIGS. 5 and 6.

Figure 2A:
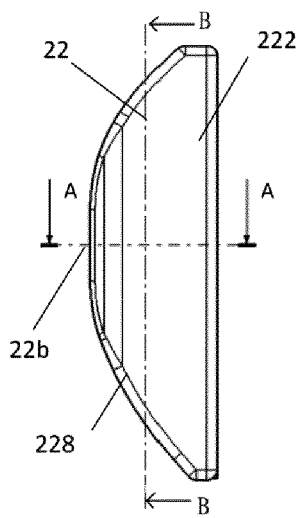
FIG. 2A is a side view of a drawing device of the shading device of FIGS. 1A to 1C.
Figure 2B:
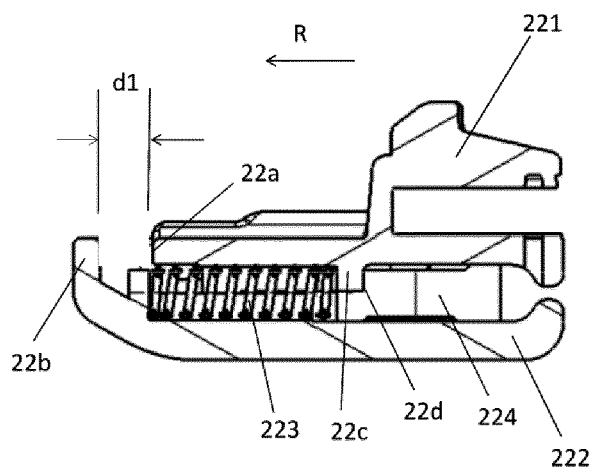
FIGS. 2B and 2C are cross-sectional views of the drawing device along a section line A-A in FIG. 2A in different states.
Figure 2C:
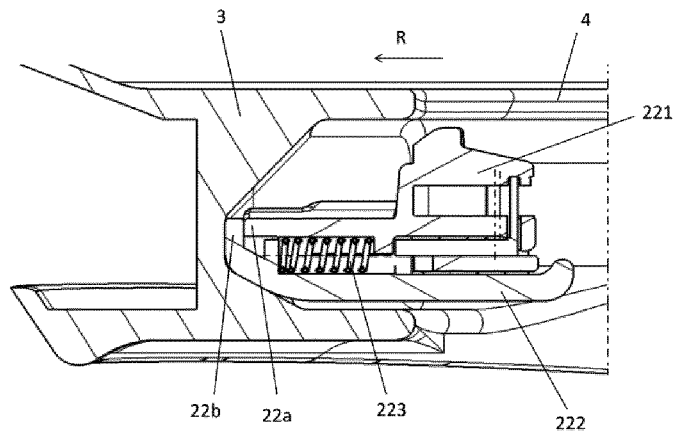
Figures 2D, 2E:
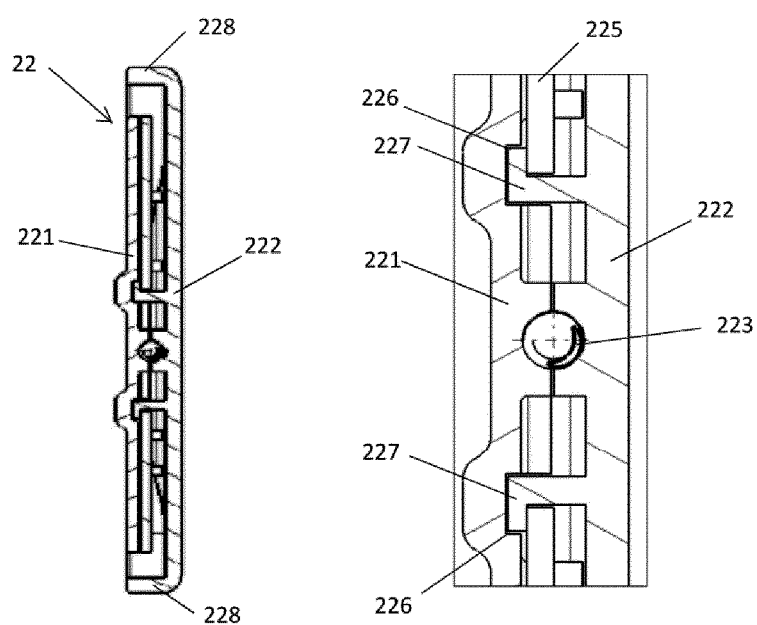
FIG. 2D is a longitudinal sectional view of the drawing device along a section line B-B in FIG. 2A.
FIG. 2E is a partial enlarged view of FIG. 2D.

A drawing device 22 according to an embodiment is described in detail with reference to FIGS. 2A to 2E, wherein FIG. 2A is a side view of the drawing device viewed from the inside of the vehicle, FIGS. 2B and 2C are cross-sectional views of the drawing device along a section line A-A in FIG. 2A in different states, FIG. 2D is a longitudinal sectional view of the drawing device along a section line B-B in FIG. 2A, and FIG. 2E is a partial enlarged view of FIG. 2D.

The drawing device 22 may include a first and a second drawing member 221, 222. The first drawing member 221 may be connected with the first shading layer 241 and may be configured to draw the first shading layer 241. For example, an end region of the first shading layer 241 may be fixed to the first drawing member 221. The second drawing member 222 may be connected with the second shading layer 242 and may be configured to draw the second shading layer 242. For example, an end region of the second shading layer 242 may be fixed to the second drawing member 222.

The first and the second drawing member 221, 222 can move relative to each other between a first relative position and a second relative position. The first relative position of the first and the second drawing member 221, 222 is shown in FIG. 2B, and the second relative position of the first and the second drawing member 221, 222 is shown in FIG. 2C. When the first and the second drawing member 221, 222 move from the first relative position to the second relative position, which may be realized for example by the drive of the driving device 23, the first and the second shading layer 241, 242 can parallelly move relative to each other, wherein the first and the second shading layer 241, 242 do not separate from each other in a normal direction of the shading curtain, or to say their position relationship does not change, which is beneficial for the optical performance of the shading curtain. In the first relative position of the first and the second drawing member 221, 222, the shading curtain 24 correspondingly has a first light transmission property. In the second relative position of the first and the second drawing member 221, 222, the shading curtain 24 correspondingly has a second light transmission property. In the shown embodiment, the deployment direction of the shading curtain 24 may be the same as the relative movement direction R of the first and the second drawing member relative to each other.

The drawing device 22 may include a spring element 223 configured as a pressure spring in the shown embodiment. The drawing device 22 may include a spring seat 224 arranged between the first and the second drawing member 221, 222, and the spring element 223 is received in the spring seat. As shown in FIGS. 2B and 2C, the first drawing member 221 may have a first stop 22c, and the spring seat 224 may have a first counter stop 22d associated therewith. The spring element 223 is supported, with an end thereof, on the second drawing member 222, and biases, with the other end thereof, the first drawing member 221, so that the first stop 22c abuts on the first counter stop 22d, thereby defining a first relative position of the first and the second drawing member 221, 222 as shown in FIG. 2B. The driving device 23 can drive the first drawing member 221, for example via an operation rod 5. During the period when the shading curtain 24 is driven from the inactive retracted state to the active deployed state, the first drawing member 221 drives the second drawing member 222 to move together due to a spring force of the spring element. After the shading curtain 24 reaches the active deployed state, the second drawing member 222 is stopped. If the first drawing member 221 is further driven, for example, by the operation rod 5, the spring force of the spring element 223 can be overcome and thus the spring element 223 can be further compressed, and the first drawing member 221 can continue to move forward relative to the second drawing member 222 in the movement direction R, until it reaches the second relative position as shown in FIG. 2C by the displacement d1, where a stop 22a of the first drawing member 221 and a stop 22b of the second drawing member 222 meet each other. In FIG. 2C, the window frame 3 and the glass 4 of the vehicle door are additionally shown. The window frame 3 may have a receiving portion for receiving the drawing device 22. As an alternative to the pressure spring, an extension spring or a torsion spring, or a combination of a plurality of spring elements may also be considered. As an alternative to the mechanical spring element, an elastic element made of elastomer may also be considered. In some embodiments not shown, the holding force between the two drawing members may be realized by a releasable snap connection, a magnetic force or a static friction force. In some embodiments not shown, it is also possible that only the second one 222 of the two drawing members is driven by the driving device 23, or that the two drawing members are driven by the driving device 23 with a time offset.

As can be seen in FIGS. 2D and 2E, the drawing device 22 may be flat, wherein the two drawing members 221 and 222 may respectively have a flat body. The two drawing members may be arranged side by side in a thickness direction, wherein the second drawing member 222 may have an edge bent toward the first drawing member 221. The curved edge may surround the first drawing member 221. The curved edge may extend in the entire circumference or in the circumference exclusive of a back side. The curved edge may form the stop 22b at the front side. Such a drawing device 22 is in a particularly compact construction.

The drawing device 22 may include a linear guide that may define the relative movement direction R of the first and the second drawing member 221, 222. In the shown embodiment, the linear guide includes a pair of guide grooves 226 in the first drawing member 221 and a pair of protrusions 227 on the second drawing member 222, which can be guided in the guide grooves. As viewed in a height direction of the drawing device 22 that is vertical to the relative movement direction R of the first and the second drawing member and vertical to the thickness direction of the first and the second drawing member, the pair of guide grooves 226 and the pair of protrusions 227 may be symmetrically arranged with respect to the spring element 223. In order to hold the two drawing members together in a simple manner, the protrusions 227 may be configured as hook-like protrusions that may be held in engagement with the guide grooves 226 by a holding plate 225 that may be arranged between the first and the second drawing member 221, 222 and may be connected with the first drawing member 221.

Now, two different embodiments of an upper guide rail structure of the shading device 20 are described with reference to FIGS. 3A and 3B, wherein two shading layers 241, 242 are partially illustrated in a height direction vertical to a deployment direction. A guide rail 25 may be configured to receive and guide an upper longitudinal side of the shading curtain 24 of the shading device 20. The guide rail 25 may have a groove 251. Upper longitudinal sides of the two shading layers 241, 242 of the shading curtain 20 can be at least sometimes, at least partially received and guided in the groove 251 during a deployment process and a retraction process of the shading curtain. The two shading layers 241, 242 may be respectively provided with a support member 243, 244 at the upper longitudinal sides, and may be guided in the groove 251 by way of the support members. In the embodiment shown in FIG. 3A, the support members 243, 244 are arranged on outer surfaces of the upper longitudinal sides of the shading layers 241, 242, while in the embodiment shown in FIG. 3B, the support members 243, 244 are arranged at the ends of the upper longitudinal sides of the shading layers 241, 242.

It is advantageous that the support members 243, 244 and the guide rail 25 can mutually generate a magnetic force, such as a magnetic attractive force and/or a magnetic repulsive force. For example, the support members 243, 244 may be magnets or at least partially made of a magnetic material, and the guide rail 25 may include a magnet or at least partially made of a magnetic material.

Figures 3A, 3B:
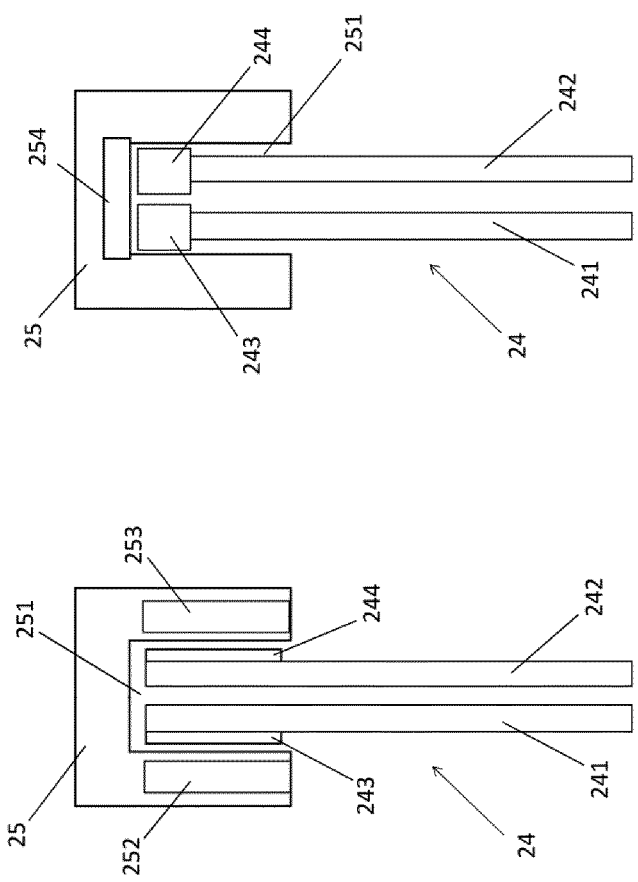
FIGS. 3A and 3B are cross-sectional views of two guide rail structures for the shading device.

In the embodiment shown in FIG. 3A, the guide rail 25 has two magnets 252, 253 that respectively interact with one of the support members 243, 244, while in the embodiment shown in FIG. 3B, the guide rail 25 has a common magnet 254 that interacts with the two support members 243, 244. The upper longitudinal sides of the two shading layers 241, 242 of the shading curtain 20 may be well received and guided in the groove 251 of the guide rail 25 through the interaction of the magnets. When a motor vehicle equipped with the shading device 20 drives, vibration may occur. Through the interaction of the magnets, the shading curtain 20 may be not obviously affected by the vibration of the motor vehicle and thus may be kept in good optical performance. The magnet of the guide rail 25 and the magnet of the shading curtain may generate a magnetic attractive force. Alternatively, the magnet of the guide rail 25 and the magnet of the shading curtain may generate a magnetic repulsive force. A combination of a magnetic attractive force and a magnetic repulsive force is also possible. It is also possible that only one of the support members is a magnet and the other support member is not a magnet. A possibility is that the support member 243 and the magnet 252 may generate a magnetic attractive force, and the support member 244 and the magnet 253 may generate a magnetic attractive force. Another possibility is that the support member 243 and the magnet 252 may generate a magnetic attractive force, while the support member 244 and the magnet 253 may generate a magnetic repulsive force, and the support member 244 is arranged on an inner surface of the upper longitudinal side of the second shading layer 242 facing the first shading layer 241.

In addition, a guide rail 26 may be similarly provide with a groove, and the guide rail 26 and a lower longitudinal side of the shading curtain 24 may be provided with a magnet arrangement in the same or similar manner. In order to avoid repetition, references may be made to the above description of the guide rail 25 and the upper longitudinal side, unless otherwise stated explicitly.

Figure 4A:
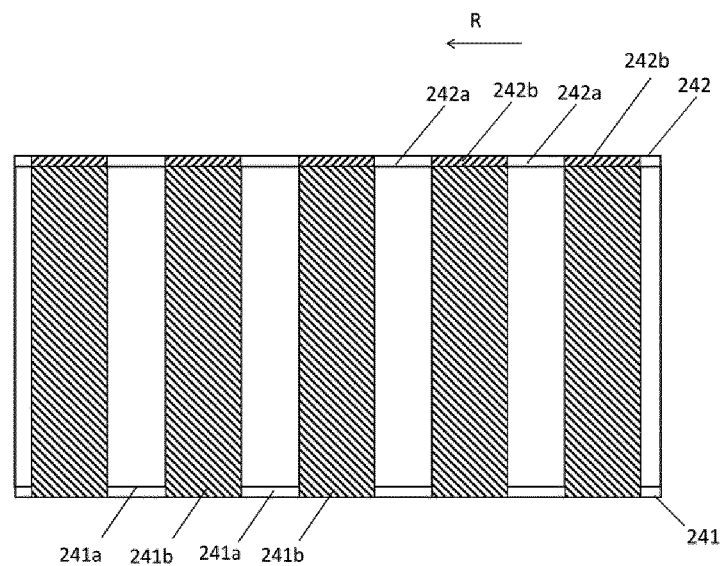
FIGS. 4A to 4C are schematic views of a shading curtain of the shading device of FIGS. 1A to 1C in different states.
Figure 4B:
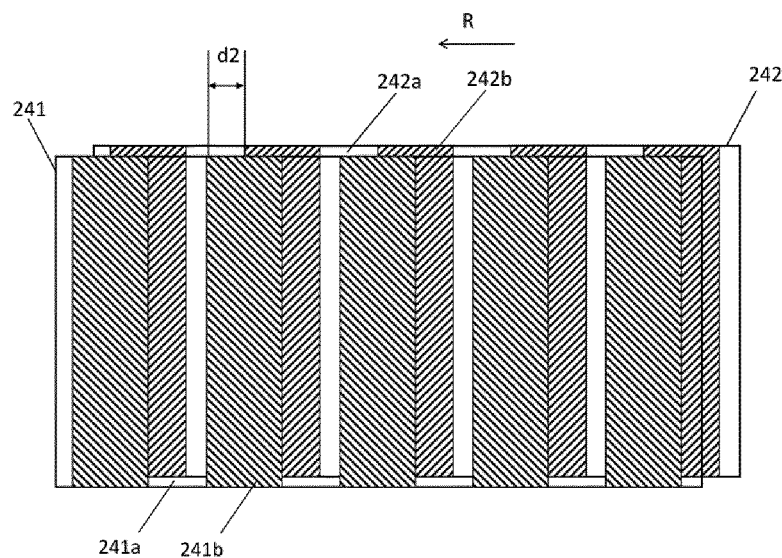
Figure 4C:
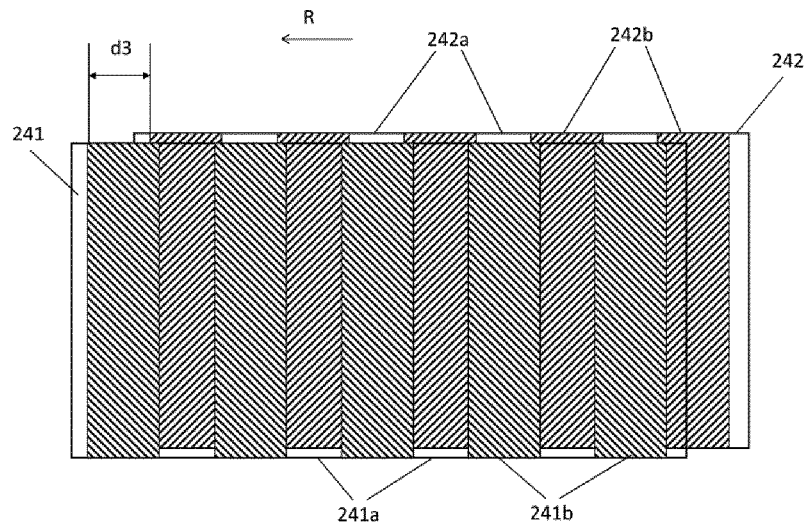

FIGS. 4A to 4C are schematic views of the shading curtain 24 of the shading device 20 of FIGS. 1A to 1C in different states, wherein the shading curtain 24 is viewed from the outside of the vehicle. In the shown embodiment, the two shading layers 241 and 242 of the shading curtain 24 may be designed identically. In order to better illustrate the two shading layers, they are shown with an offset in a height direction. In practice, the two shading layers may fully overlap in the height direction. Each individual shading layer 241, 242 may have first light transmission areas 241a, 242a and second light transmission areas 241b, 242b arranged alternately and periodically. Each light transmission area may extend transversely to the deployment direction of the shading curtain and may have a constant width. It is advantageous that the first light transmission areas 241a, 242a may be transparent or translucent, while the second light transmission areas 241b, 242b may be opaque. It is advantageous that the first light transmission areas may have a smaller width than the second light transmission areas. The shading layers may be made of a flexible material, such as fabric.

FIG. 4A shows the shading curtain 24 in a first state that may correspond to the first relative position of the first and the second drawing member, in which the first light transmission areas 241a, 242a of the first and the second shading layer 241, 242 overlap, and the second light transmission areas 241b, 242b of the first and the second shading layer 241, 242 overlap. This situation corresponds to the maximum light transmission state of the shading curtain 24.

FIG. 4B shows the shading curtain 24 in a second state that may correspond to an intermediate positon between the first relative position and the second relative position, wherein the first light transmission areas 241a, 242a of the first and the second shading layer 241, 242 are offset with a displacement d2 smaller than the relative movement displacement d1 of the first and the second drawing member, and the second light transmission areas 241b, 242b of the first and the second shading layer 241, 242 are offset with the displacement d2. This situation corresponds to an intermediate light transmission state of the shading curtain 24.

FIG. 4C shows the shading curtain 24 in a third state that may correspond to the second relative position of the first and the second drawing member. The first shading layer moves relative to the second shading layer by a displacement d3 that may be equal to the relative movement displacement d1 of the first and the second drawing member. The first light transmission areas 241a of the first shading layer overlap with the second light transmission areas 242b of the second shading layer, and the second light transmission areas 241b of the first shading layer overlap with the first light transmission areas 242a of the second shading layer. This situation corresponds to the minimum light transmission state of the shading curtain 24.

In the embodiment shown in FIGS. 4A to 4C, during the period when the first and the second drawing member are switched from the first relative position to the second relative position, the shading curtain 24 continuously switches from the maximum light transmission state to the minimum light transmission state. In some embodiments not shown, it is also possible that the shading curtain 24 may be continuously switched from the minimum light transmission state to the maximum light transmission state when the first and the second drawing member are switched from the first relative position to the second relative position. In some embodiments not shown, it is also possible that the shading curtain 24 may be continuously switched from the maximum light transmission state to the minimum light transmission state at first and then from the minimum light transmission state to the maximum light transmission state when the first and the second drawing member are switched from the first relative position to the second relative position. This situation may correspond to a larger relative movement displacement of the two shading layers or to say the two drawing members.

Figure 5:
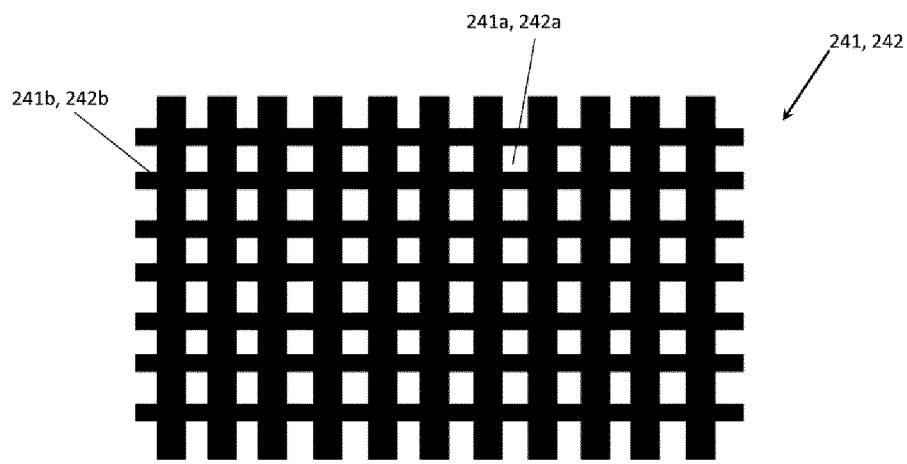
FIGS. 5 and 6 are schematic views of other embodiments of an individual shading layer for a shading curtain.
Figure 6:
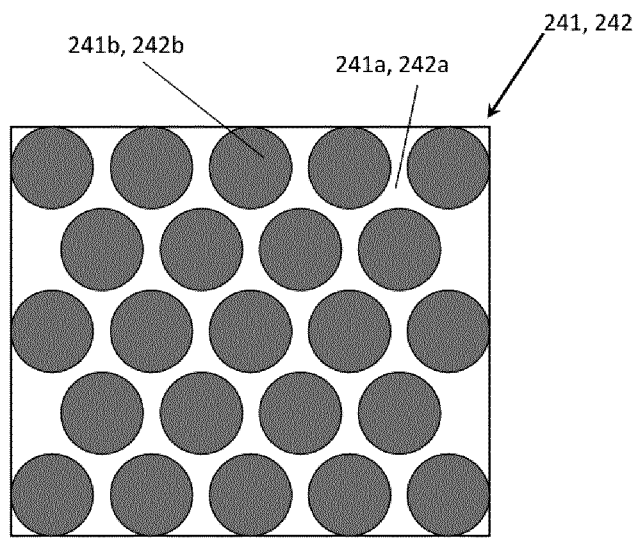

FIG. 5 is a schematic view of another embodiment of an individual shading layer 241, 242 for a shading curtain 24. Two shading layers may be configured identically. The individual shading layer has grid-like transparent or translucent first light transmission areas 241a and 242a and opaque second light transmission areas 241b and 242b in the form of horizontal stripes and vertical stripes. FIG. 6 is a schematic view of another embodiment of an individual shading layer 241, 242 for a shading curtain 24. Two shading layers may be configured identically. The individual shading layer may have a continuous transparent or translucent first light transmission area 241a, 242a and a plurality of round opaque second light transmission areas 241b, 242b distributed regularly.

In some embodiments not shown, the shading curtain may have a third shading layer that may be configured the same as or different from the first and/or the second shading layer, and may be configured to be movable or immovable with respect to the first and/or the second shading layer. To this end, for example, the drawing device may have a third drawing member, or one of the drawing members may be configured to jointly draw two of the three shading layers in total.

Figure 7:
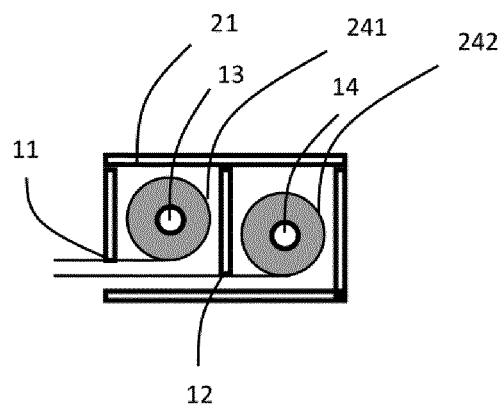
FIG. 7 is a schematic cross-sectional view of a housing of the shading device of FIGS. 1A to 1C.

FIG. 7 is a schematic cross-sectional view of the housing 21 of the shading device of FIGS. 1A to 1C. Two reels 13, 14 are arranged side by side in the housing 21, and are respectively provided with a return spring (not shown) acting in a winding direction. The first shading layer 241 may be rolled on the first reel 13 and guided on the first guide edge 11 of the housing 21. The second shading layer 242 may be rolled on the second reel 14 and guided on the second guide edge 12 of the housing 21. In an embodiment not shown, in a cross section of the housing 21, the two reels 13, 14 may be arranged one above the other, for example, they may overlap completely or partially. In an embodiment not shown, the first and the second shading layer may also be rolled on a common reel.

It may be understood that the present invention is described with the aid of the above specific embodiments, but is not limited thereto. Those skilled in the art may make modifications on the basis of the disclosure in the present application, all of which do not leave away from the protection scope of the present invention. Individual technical features introduced in the present application, even if they are introduced in different paragraphs of the description or in different embodiments, may be arbitrarily combined with each other, as long as they are not contradictory.

The invention claimed is:

1. A shading device comprising:
    a shading curtain having a first shading layer and a second shading layer that respectively have at least two types of light transmission areas with different light transmission properties;
    a drawing device having a first drawing member and a second drawing member, wherein the first drawing member is connected with the first shading layer and is configured to draw the first shading layer, and the second drawing member is connected with the second shading layer and is configured to draw the second shading layer; and
    a driving device configured to drive the drawing device, wherein:
    the driving device is an electric motor,
    the first drawing member and the second drawing member are movable relative to each other between a first relative position, in which the shading curtain has a first light transmission property, and a second relative position, in which the shading curtain has a second light transmission property, wherein the first shading layer and the second shading layer parallelly move relative to each other, and
    the driving device is configured to drive the drawing device such that the drawing device moves as a whole to deploy and/or retract the shading curtain, and such that the first drawing member and the second drawing member linearly move relative to each other subsequently to a deployment movement of the shading curtain.

2. The shading device according to claim 1, wherein:
    the shading curtain is switchable between an inactive retracted state and an active deployed state,
    the drawing device is configured to draw the shading curtain from the inactive retracted state to the active deployed state, and
    a deployment direction of the shading curtain is the same as a direction in which the first drawing member and the second drawing member move relative to each other.

3. The shading device according to claim 1, wherein:
    the driving device is configured such that the first drawing member and the second drawing member are switchable to an intermediate relative position between the first relative position and the second relative position.

4. The shading device according to claim 3, wherein:
    the driving device is configured to drive one of the drawing members of the drawing device, and
    the driving device is configured to drive the one of the drawing members of the drawing device during a deployment movement of the shading curtain and during a movement of the first drawing member and the second drawing member relative to each other following the deployment movement.

5. The shading device according to claim 3, wherein the driving device can drive the drawing device by a support rod,
    the support rod is movable in a plane, and
    the shading device further comprises a guide rail configured to receive and guide the support rod.

6. The shading device according to claim 5, wherein the guide rail is further configured to receive and guide a longitudinal side of the shading curtain.

7. The shading device according to claim 1, wherein:
    the first drawing member and the second drawing member are holdable in one of the first relative position or the second relative position under an action of a holding force, and are switchable to the other of the first relative position and the second relative position against the holding force, and
    the first drawing member and the second drawing member are holdable in the one of the first relative position or the second relative position by a holding force of an elastic element.

8. The shading device according to claim 7, wherein:
    the elastic element is a spring element that biases one of the drawing members relative to the other drawing member in the first relative position, and
    the one of the drawing members is translationally movable to the second relative position relative to the other drawing member against a spring force of the spring element by a predetermined displacement.

9. The shading device according to claim 1, wherein:
    the first relative position and the second relative position of the first drawing member and the second drawing member are respectively defined by a pair of stops of the drawing device, and
    the first drawing member and the second drawing member have the pair of stops for the second relative position at their ends.

10. The shading device according to claim 8, wherein:
    the spring element biases, with an end thereof, a first stop of the one of the drawing members for the first relative position on a first counter stop that is stationary relative to the other drawing member, and is, with the other end thereof, fixed to the other drawing member,
    the drawing device includes a spring seat arranged between the first drawing member and the second drawing member,
    the spring element is received in the spring seat, and
    the spring seat has the first counter stop.

11. The shading device according to claim 4, wherein:
    the drawing device has a linear guide defining a direction in which the first drawing member and the second drawing member move relative to each other,
    the linear guide includes a guide groove in one of the first drawing member or the second drawing member and a protrusion on the other of the first drawing member or the second drawing member,
    the protrusion is guidable along the guide groove,
    as viewed in a height direction of the drawing device that is vertical to the direction in which the first drawing member and the second drawing member move relative to each other, the linear guide includes a pair of guide grooves and a pair of protrusions,
    the spring element is centrally arranged between the pair of guide grooves and between the pair of protrusions, the spring element biases the first drawing member and the second drawing member in the first relative position, the protrusion is a hooked protrusion that is held in engagement with the guide groove by a holding plate, and the holding plate is arranged between the first drawing member and the second drawing member and is connected with the one of the drawing members.

12. The shading device according to claim 1, wherein one of the first drawing member or the second drawing member has a curved edge that surrounds the other of the first drawing member and the second drawing member.

13. The shading device according to claim 1, wherein:
the first light transmission property corresponds to one of a maximum light transmission amount and a minimum light transmission amount of the shading curtain,
the second light transmission property corresponds to the other of the maximum light transmission amount and the minimum light transmission amount of the shading curtain,
each respective shading layer has first light transmission areas and second light transmission areas that are arranged alternately and periodically,
an area size of the respective first light transmission areas is less than or equal to an area size of the respective second light transmission areas, and/or a light transmission rate of the first light transmission areas is greater than a light transmission rate of the second light transmission areas, and
in the first relative position, the first light transmission areas of the first shading layer and the second shading layer overlap, and the second light transmission areas of the first shading layer and the second shading layer overlap; and/or in the second relative position, the first light transmission areas of the first shading layer overlap with the second light transmission areas of the second shading layer, and the second light transmission areas of the first shading layer overlap with the first light transmission areas of the second shading layer.

14. The shading device according to claim 1, wherein the first shading layer and the second shading layer are respectively made of a flexible material.

15. The shading device according to claim 1, wherein the shading device is configured for a vehicle.

16. The shading device according to claim 15, wherein
the shading device is configured for a side window of a motor vehicle, and
the shading curtain is configured to be deployed from one side to the other side of a front side and a rear side of the side window.

17. The shading device according to claim 1, wherein:
the shading curtain is configured to be rollable up,
the first shading layer and the second shading layer are respectively provided with a reel and a return spring acting on the reel in a winding direction,
the shading device has a housing, into which the shading curtain is rollable and in which the reel and the return spring for the shading curtain are accommodated, and
the housing has a first guiding edge for the first shading layer and a second guiding edge for the second shading layer.

18. The shading device according to claim 1, further comprising a guide rail configured to receive and guide a longitudinal side of the shading curtain.

19. The shading device according to claim 18, wherein:
the guide rail has a groove,
the first shading layer and the second shading layer of the shading curtain are provided with support members on a longitudinal side,
the first shading layer and the second shading layer are receivable and guidable in the groove of the guide rail,
the support members are first magnets, and
the guide rail has second magnets that cooperate with the first magnets of the shading layers.

* * * * *